United States Patent [19]
Furuta et al.

[11] Patent Number: 5,733,047
[45] Date of Patent: Mar. 31, 1998

[54] ENCIPHERING SYSTEM APPLICABLE TO VARIOUS KEYLESS ENTRY SYSTEMS

[75] Inventors: Noritoshi Furuta, Nishio; Masahiro Goto, Okazaki, both of Japan

[73] Assignee: Nippon Soken, Inc., Nishio, Japan

[21] Appl. No.: 575,136

[22] Filed: Dec. 19, 1995

[30] Foreign Application Priority Data

Dec. 19, 1994 [JP] Japan .................... 6-315107

[51] Int. Cl.⁶ .................................. H04K 1/00
[52] U.S. Cl. ................... 384/43; 380/28; 380/49
[58] Field of Search .................... 380/23, 25, 4, 380/49, 28, 43, 42, 46

[56] References Cited

U.S. PATENT DOCUMENTS

| | | |
|---|---|---|
| 5,369,706 | 11/1994 | Latka . |
| 5,420,925 | 5/1995 | Michaels ................ 380/23 |
| 5,598,475 | 1/1997 | Soenen et al. ............ 380/23 |

FOREIGN PATENT DOCUMENTS

6-239202  8/1994  Japan .

*Primary Examiner*—David C. Cain
*Attorney, Agent, or Firm*—Cushman Darby & Cushman IP Group of Pillsbury Madison & Sutro LLP

[57] ABSTRACT

An enciphering system comprises a transmitter (1) and a receiver (2) communicatable with each other and incorporated in a keyless entry system. The transmitter (1) comprises a memory (11) for memorizing an ID code, a first micro processor (12) for enciphering the ID code outputted from the memory (11), and a transmitting section (13) for transmitting an enciphered ID code produced by the first micro processor (12). The receiver (2) comprises a receiving section (22) for receiving the enciphered ID code transmitted from the transmitter (1) and a second micro processor (21) for decoding the enciphered ID code. The first micro processor (12) divides both the ID code and an associated rolling code into a plurality of blocks, the rolling code varying its content in response to each transmission of the ID code through the transmitting section (13), determines a repetition number for an enciphering arithmetic operation in a process of the arithmetic operation, and repeats the enciphering arithmetic operation in each block according to the repetition number, thereby enciphering the ID code. The second micro processor (21) decodes the enciphered ID code by reversely performing the operation of the first micro processor (12).

20 Claims, 7 Drawing Sheets

ENCIPHERING SYSTEM APPLICABLE TO VARIOUS KEYLESS ENTRY SYSTEMS

BACKGROUND OF THE INVENTION

1. Field of the Invention

This invention relates to an enciphering system for enciphering an ID code used in a keyless entry system employed, for example, in an automotive vehicle.

2. Related Art

There is known a keyless entry system which enables us to lock and unlock doors of an automotive vehicle by remote control without requiring us to insert a key into a key cylinder every time. More specifically, the keyless entry system generally includes a handy transmitter capable of transmitting weak radio wave carrying an ID code thereon. This handy transmitter is normally kept by an owner of the automotive vehicle.

Meanwhile, the automotive vehicle is equipped with an antenna and an ECU (i.e. Electric Control Unit) serving as a receiver. The antenna receives the radio wave sent from the transmitter, and the ECU discriminates or analyzes the ID code received and then activates a door lock/unlock actuator when the received ID code meets the authorized ID code.

The transmitter, constituted by a compact-size one chip device including an ID code memory circuit and a modulation circuit, is incorporated or assembled into the key body of the automotive vehicle.

A key plate of the key serves as a transmission antenna of the transmitter. A battery is also accommodated in the key body. Thus, in response to each pushing operation of a transmission key provided on the surface of the key, the transmitter reads out the ID code from the ID code memory circuit and causes the modulation circuit to modulate the readout ID code into an appropriate transmission signal which is to be sent through the transmission antenna (i.e. key plate).

The receiver in the automotive vehicle, when it recognizes the arrival of such a transmission signal (i.e. ID code), controls the door lock/unlock actuator to alternately lock and unlock the doors in response to each reception of the ID code.

The ID code signal, used in this keyless entry system, is transmitted via air. Therefore, this ID code is relatively easily monitored by an unauthorized user. Weakness to such an unauthorized eavesdropping possibly results in the burglar of the automotive vehicle. The burglar of automotive vehicles will be also succeeded by knowing a signal releasing the burglar alarm system, if the ID code is not available.

In view of the above, it is essentially important for providing an excellent and reliable burglar system to change the enciphering signal of the ID code each transmission thereof.

To this end, the rolling code which can vary its code signal every time may be combined with the ID code. However, using the rolling code will be not so effective if the next transmitted code signal is easily predictable. The number of rolling codes is determined by the bit number used in the rolling code.

For example, a 4-bit rolling code can provide up to 18 kinds of rolling codes. In other words, the burglar is surely accomplished by transmitting all of the possible ID codes (i.e. through a try-and-error of a total of 16 code signal transmissions). This is why increasing the number of rolling codes is effective to protect automotive vehicles from the burglar.

A representative method of scrambling code signals is the encryption. A conventional encryption method providing a strong cipher is a non-linear encryption method using random numbers. The encryption method using random numbers requires a transmitter and a receiver to possess a large-scale memory for storing random numbers or generating the same.

When the code signal is enciphered for the automotive burglar alarm system, it is necessary to prepare the same number of random numbers as that of the rolling codes. In view of practical effectiveness for preventing the burglar, a memory will be required to have a capacity of storing random numbers of 64 bits or more. Installing or incorporating such a large-scale memory into a key of an automotive vehicle will not be realized from the smallness of the key body.

SUMMARY OF THE INVENTION

Accordingly, in view of above-described problems encountered in the related art, a principal object of the present invention is to provide an enciphering system which is capable of enciphering an ID code so as to be varied every transmission, and making it difficult to predict the ID code next transmitted, without requiring a large-scale memory for storing random numbers.

In order to accomplish this and other related objects, a first aspect of the present invention provides an enciphering system comprising a transmitter for sending an ID code to an object employing a keyless entry system, the transmitter comprising: memory means for memorizing the ID code; first arithmetic means for enciphering the ID code outputted from the memory means; and transmitting means for transmitting an enciphered ID code produced by the first arithmetic means; wherein the first arithmetic means divides both the ID code and an associated rolling code into a plurality of blocks, the rolling code varying its content in response to each transmission of the ID code through the transmitting means, determines a repetition number for an enciphering arithmetic operation in a process of the arithmetic operation, and repeats the enciphering arithmetic operation in each block according to the repetition number, thereby enciphering the ID code.

The above enciphering system further comprises a receiver comprising: receiving means for receiving an enciphered ID code; and second arithmetic means for decoding the enciphered ID code, wherein the second arithmetic means decodes the enciphering ID code by reversely performing the enciphering arithmetic operation of the transmitter.

In the above enciphering system, the first arithmetic means enciphers the ID code and the rolling code in each block by repeating a bit arithmetic operation of replacement, shift and exclusive OR and a randomization using pseudorandom numbers.

The randomization is performed using maximum length shift register sequence of primitive polynomial or a recurrence formula of a linear congruence method.

It is preferable that the memory means, the first arithmetic means and the transmitting means are assembled into a handy unit, while the receiving means and the second arithmetic means are provided in an object to be protected by a burglar alarm system.

For example, the object to be protected by the burglar alarm system is an automotive vehicle and the handy unit is a key for the automotive vehicle.

Furthermore, a second aspect of the present invention provides an enciphering method comprising steps of: memorizing an ID code in a transmitter; dividing both the ID code and an associated rolling code into a plurality of blocks, the rolling code varying its content in response to each transmission of the ID code through the transmitter; determining a repetition number for an enciphering arithmetic operation in a process of the arithmetic operation; repeating the enciphering arithmetic operation in each block according to the repetition number, thereby enciphering the ID code, and transmitting the enciphered ID code from the transmitter to a receiver; receiving the enciphered ID code in the receiver; decoding the enciphered ID code in the receiver by reversely performing the operation of the enciphering arithmetic operation.

The ID code and the rolling code are enciphered in each block by repeating a bit arithmetic operation of replacement, shift and exclusive OR and a randomization using pseudo-random numbers.

The randomization is performed using maximum length shift register sequence of primitive polynomial or a recurrence formula of a linear congruence method.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENT

A preferred embodiment of the present invention will be explained in greater detail hereinafter, with reference to the accompanying drawings. Identical parts are denoted by identical reference numerals throughout views.

Figure 1:
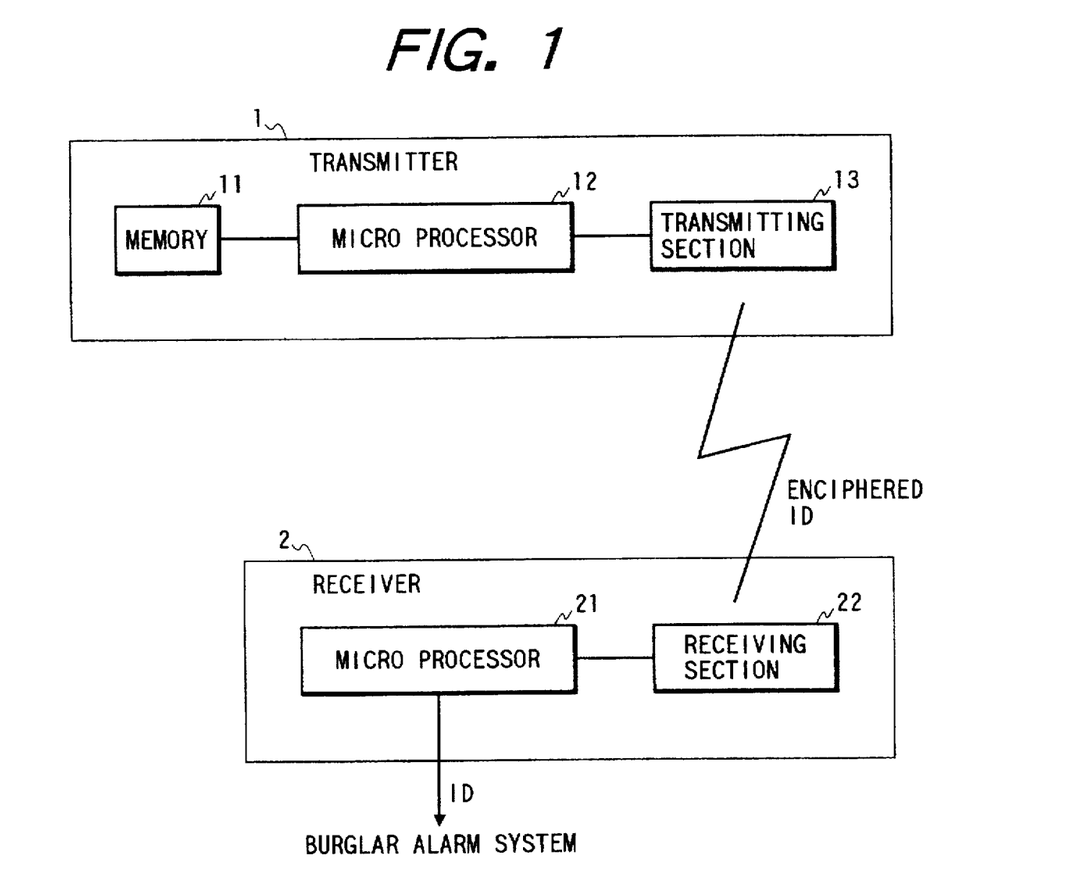
FIG. 1 is a view showing an encipher system in accordance with one embodiment of the present invention.

FIG. 1 is a view showing an encipher system in accordance with one embodiment of the present invention. As shown in FIG. 1, the encipher system basically consists of a transmitter 1 and a receiver 2 communicatable with each other. The transmitter 1 comprises a memory 11 storing an identification (ID) code, a micro processor 12 enciphering the ID code outputted from the memory 11, and a transmitting section 13 modulating the enciphered ID code into an appropriate transmission signal which is transmittable to the receiver 2. On the other hand, the receiver 2 comprises a receiving section 22 and a micro processor 21. The receiving section 22 receives a signal transmitted from the transmitter 1, i.e. the enciphered ID code signal, and demodulates the same, while the micro processor 21 decodes the received enciphered ID code into an ID code, after the received enciphered ID code signal is demodulated in the receiving section 22. The transmitter 1 is installed or assembled into a portable or handy unit, such as a key for an automotive vehicle, while the receiver 2 is provided in an object to be protected by a burglar alarm system, such as an automotive vehicle itself.

More specifically, the micro processor 12 has functions of dividing the ID code and an associated rolling code into several blocks, and enciphering the code in each block by repeating the bit arithmetic operation of replacement, shift and exclusive OR and the randomization using pseudo-random numbers. The repeat number of the randomization using pseudo-random numbers is determined by a numeral in the process of the arithmetic operation. This is effective to provide a cipher signal fairly strong against unauthorized eavesdropping. What is transmitted is an enciphered signal constituted by random numbers; therefore, it is also difficult to predict the code signal to be transmitted next. The randomization by pseudo-random numbers is carried out through arithmetic processes; therefore, the enciphering operation can be realized by using a simple logic circuit or a single micro processor which is sufficiently compact and installable in a key of an automotive vehicle.

Figure 2:
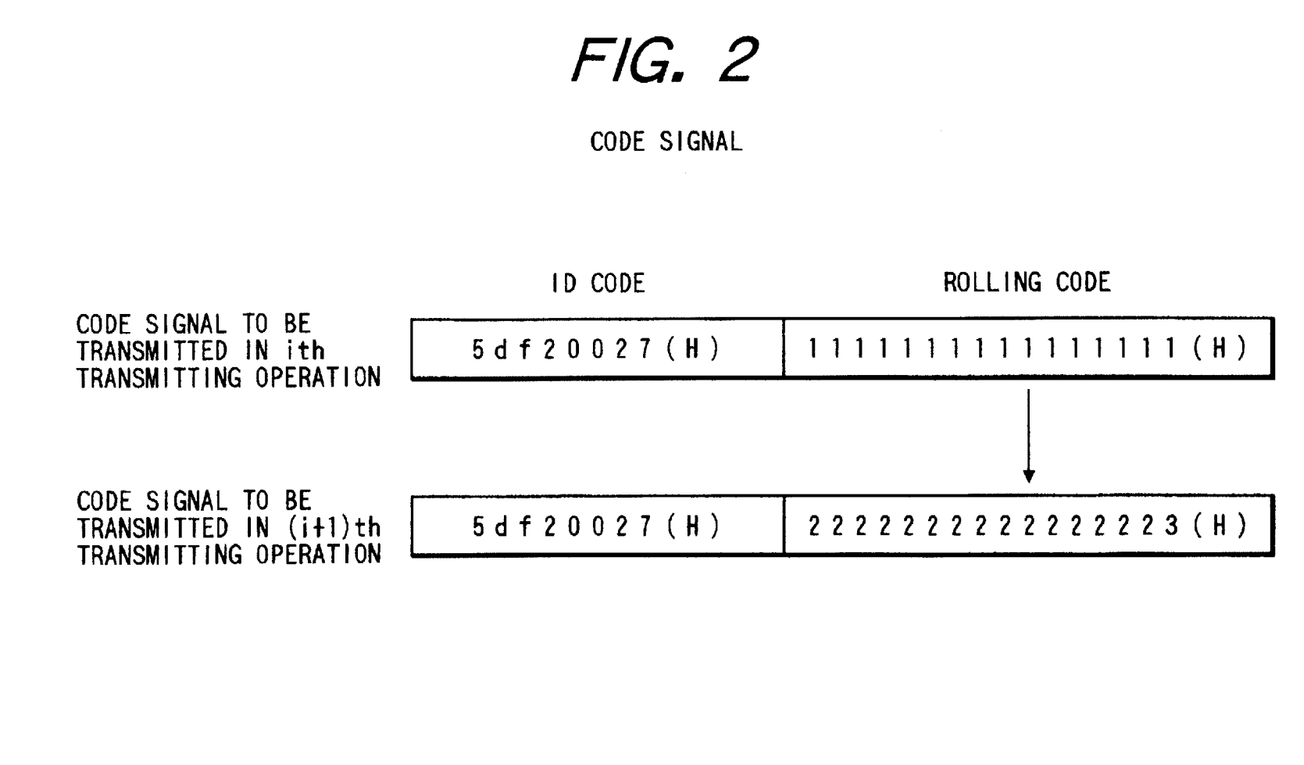
FIG. 2 is a diagram showing examples of code signals to be used in the embodiment of the present invention.

FIG. 2 is a diagram showing examples of code signals to be used in this embodiment. As shown in the drawing, the ID code is constituted by 32 bits of numbers and the rolling code is constituted by 64 bits.

Figure 3:
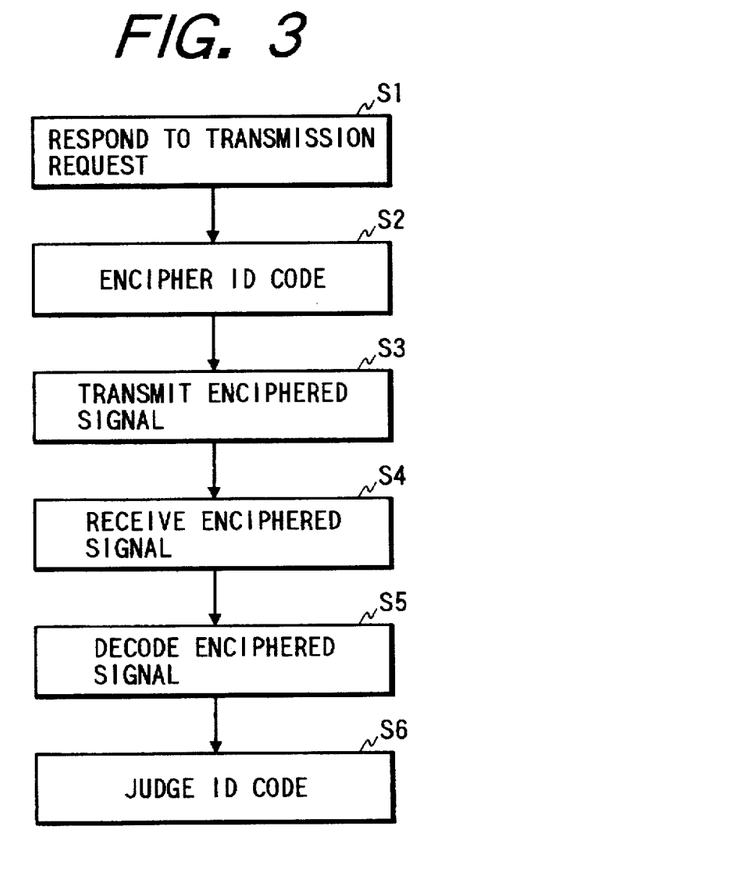
FIG. 3 is a flow chart showing an operation of the encipher system shown in FIG. 1.

FIG. 3 is a flow chart showing an overall operation of the encipher system shown in FIG. 1. In step S1, the encipher system responds to a transmission request such as a depression of a transmission button (not shown) provided on the surface of the transmitter 1.

In step S2, the encipher system causes the micro processor 12 to encipher the ID code in response to the transmission request. As shown in FIG. 2, the rolling code varies its content (i.e. combination of numerals) every transmitting operation. More specifically, one method of varying the rolling code is to increment its value by one every transmission. For example, if the rolling code presently transmitted is expressible by 1111111111111111 (H) in terms of 64 bits, the next rolling code will be expressed by 1111111111111112 (H). According to another method, the rolling code can be varied every transmission through a calculation using maximum length shift register sequence of primitive polynomial, wherein the rolling code 1111111111111111 (H) would be changed to 2222222222222223 (H) in the next transmitting operation.

In step S3, the transmitting section 13 modulates the enciphered ID code into an appropriate transmission signal and transmits it to the receiver 2.

In step S4, the receiving section 22 of the receiver 2 receives the transmission signal transmitted from the transmitter 1, and demodulates the same.

In step S5, the micro processor 21 decodes the demodulated signal into a deciphered ID code which is subsequently transmitted to a burglar alarm system.

In step S6, a judgement is made to check the content of thus deciphered ID code.

Figure 4:
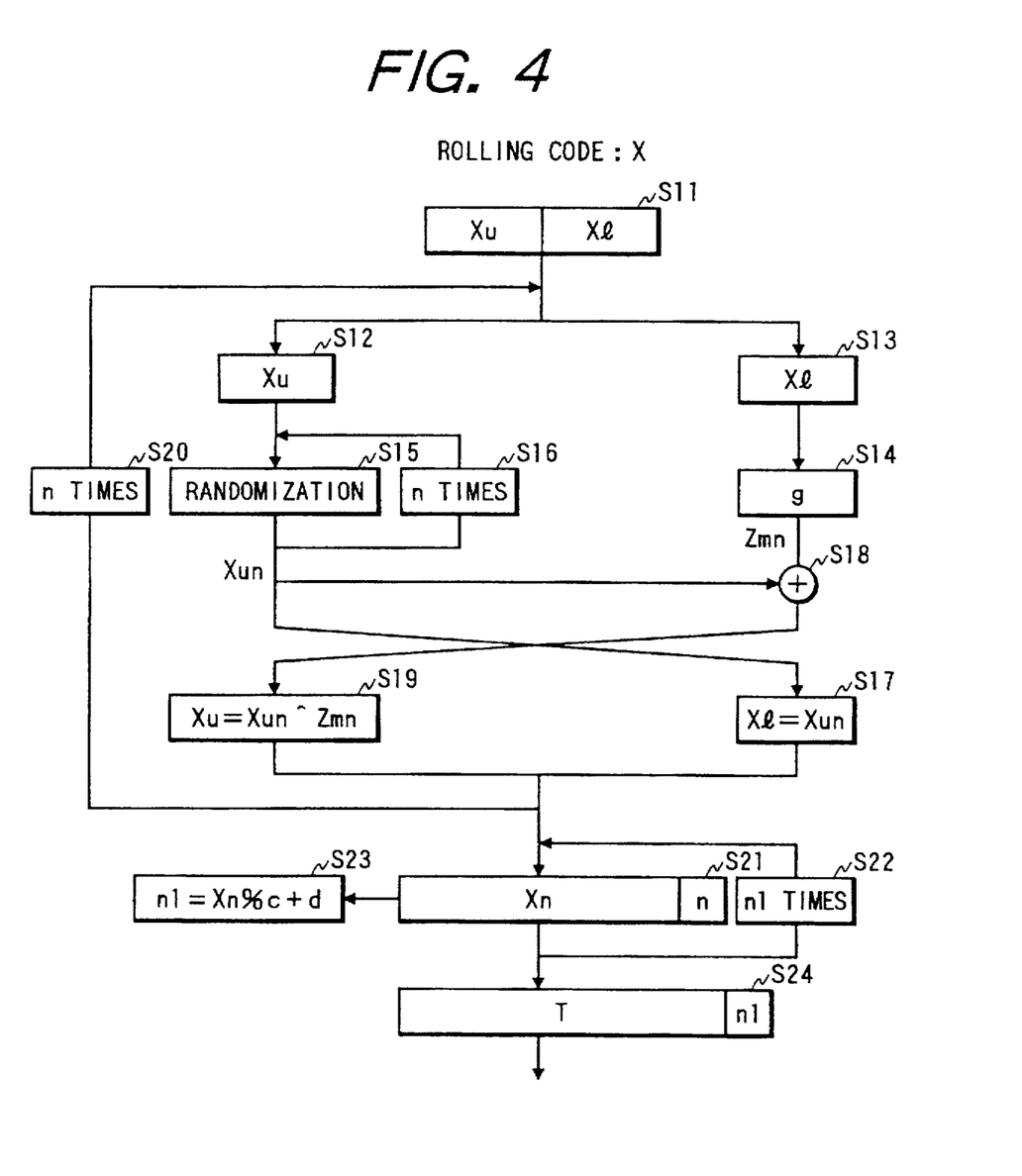
FIG. 4 is a flow chart showing details of an enciphering procedure in accordance with the embodiment of the present invention.
Figure 5:
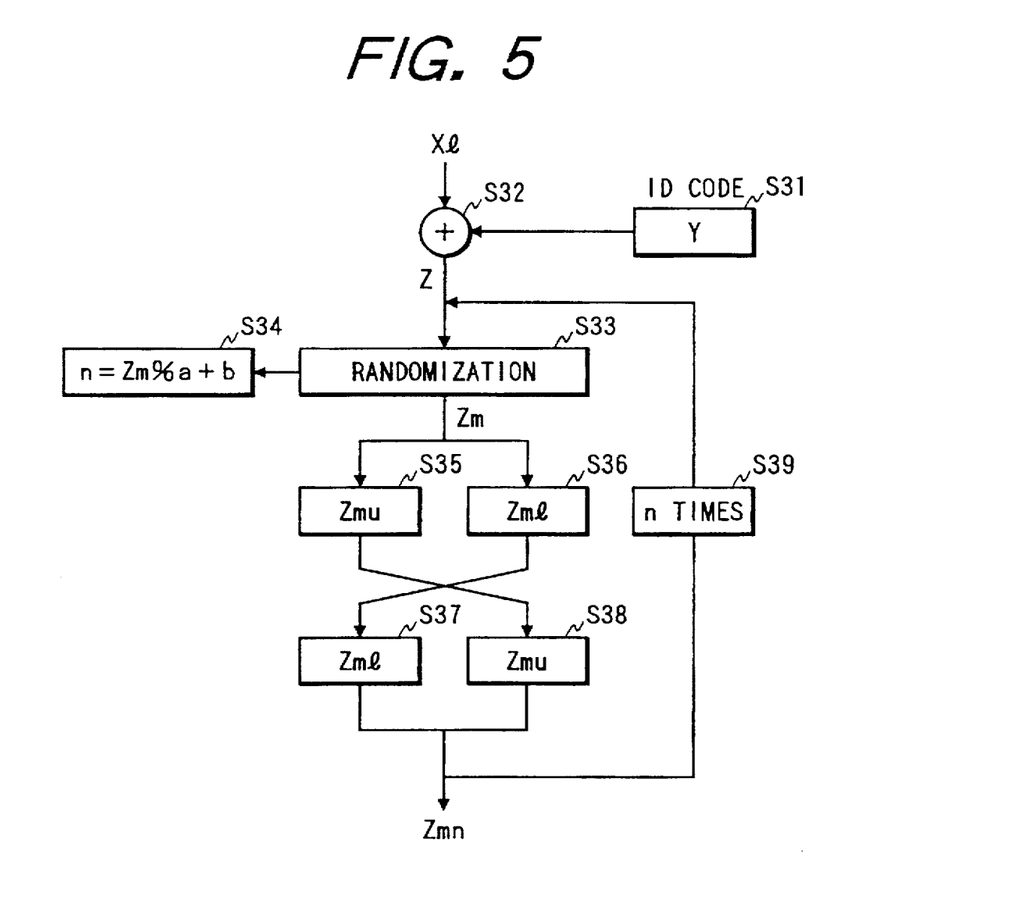
FIG. 5 is a flow chart showing part of the above enciphering procedure in accordance with the embodiment of the present invention.

FIGS. 4 and 5 are flow charts showing details of the enciphering procedure executed by the micro processor 12. It is now assumed that "X" represents the rolling code of 64 bits while "Y" represents the ID code of 32 bits. First of all, in step S11 of FIG. 4, the rolling code "X" is divided into two blocks of an upper order block Xu and a lower order block Xl.

These upper order block Xu and lower order block Xl are memorized in steps S12 and S13, respectively.

In the next step S14, the processing of an ID code combining section "g" is performed to obtain "Zmn" from the lower order block "X1". The details of the processing of the ID code combining section "g" will be explained later with reference to steps S31 through S39 shown in FIG. 5.

In steps S15 and S16, the upper order block Xu of the rolling code "X" is randomized n times using maximum length shift register sequence of 32-bit primitive polynomial, thereby obtaining "Xun" from the upper order block "Xu".

In step S17, thus obtained "Xun" is memorized as a lower order block "Xl" for the next calculation (i.e. Xl=Xun).

In step S18, an exclusive OR operation is performed for the result "Zmn" of the step S14 and the result "Xun" of the steps S15 and S16.

In step S19, the calculated value of the step S18 is memorized as an upper order block "Xu" for the next calculation (i.e. Xu=Xun ^ Zmn).

In step S20, returning to the steps S12 and S13, the above-described steps S11 through S19 are repeated n times. The resultant value is then memorized as "Xn".

Subsequently, steps S21 and S22 obtain an arithmetic repetition number "n1". The arithmetic repetition number is required to be a decodable number. Thus, the remainder in division is used in this embodiment. More specifically, the value "Xn" is divided by a constant "c" and the remainder of this division (i.e. Xn % c) is added to another constant "d", thereby obtaining an arithmetic repetition number "n1". In this embodiment, the mark "%" is used as an arithmetic expression for obtaining a remainder in a given division.

Now, the method of determining the arithmetic repetition number n1 is explained in more detail. To prevent unauthorized decoding of the randomization algorithm, this invention varies the arithmetic repetition number n1 every time to output each random number using a different arithmetic operation every time.

Accordingly, to obtain an arithmetic repetition number n1 variable every time, this invention uses the equation involving a variable parameter, i.e. the above-described equation n1=Xn % c+d. In this embodiment, the bit number of the arithmetic repetition number n1 is fixed to 4, to provide a transmission signal consisting of a code and a repetition number.

More specifically, to obtain this 4-bit arithmetic repetition number every time, the arithmetic equation using the remainder in division is indeed effective. This is the reason why the above-described equation n1=Xn % c+d is used in this embodiment. For example, when the constant "c" is equal to 5, the remainder term "Xn % c" on the right side of this equation becomes any one of 0, 1, 2, 3 and 4 irrespective of the value of "Xn".

The result of the steps S21 and S22, i.e. n1=Xn % c+d, is memorized in step S23.

In step S24, "Xn" is randomized using the primitive polynomial which can express both "Xn" and "n1". For example, a 68-bit primitive polynomial will suit for "n1" of 4 bits. Namely, the total number of bits would be 68 when a 64-bit rolling code is combined with a 4-bit repetition number. Through this randomization, a ciphered code "T" is finally obtained. The ciphered code "T" and the arithmetic repetition number "n1" cooperatively constitute a ciphered code signal to be transmitted.

Next, with reference to the flow chart of FIG. 5, the details of the processing of the ID code combining section "g" will be explained.

In step S31, the ID code is temporarily memorized as "Y".

In step S32, an exclusive OR operation is performed for the lower order block "Xl" of the rolling code and the ID code "Y" (i.e. Z=Xl ^ Y)

In step S33, the resultant data of the step S32 is randomized to obtain "Zm" using maximum length shift register sequence of 32-bit primitive polynomial.

In step S34, the randomized data "Zm" is divided by a constant "a" and the remainder of this division is added to another constant "b", thereby obtaining an arithmetic repetition number "n" (=Zm % a+b).

In steps S35 and S36, the randomized result "Zm" is divided into an upper order block "Zmu" and a lower order block "Zml".

In steps S37 and S38, the upper order block "Zmu" and the lower order block "Zml" are mutually replaced, thereby memorizing "Zml" in the first cycle. The above-described randomization and replacement is repeated "n" times by giving the replacement result of the steps S37 and S38 to the step S33 through step S39, and then a resultant data in the n cycle is memorized as "Zmn".

The randomization of maximum length shift register sequence of primitive polynomial is as follows:

a) bits expressed by the primitive polynomial are applied an exclusive OR operation; and b) original numerals are shifted left by one bit, and the result of a) is entered into the lowest order bit.

For example, for a 32-bit pseudo-randomization, the primitive polynomial is expressed by X32+X7+X5+X3+X2+X1+X0. When the highest order bit is the 32nd bit and the lowest order bit is the 1st bit, the exclusive OR operation is performed for the 32nd bit, 7th bit, 5th bit, 3rd bit, 2nd bit and 2st bit. Then, the exclusive OR result thus obtained is entered into the 1st bit, while the numerals in the original 32 bits are shifted left by one bit.

Next, the arithmetic operation for decoding (i.e. deciphering) the enciphered code will be explained. This operation is performed by reversing the above-described enciphering operation.

Figure 6:
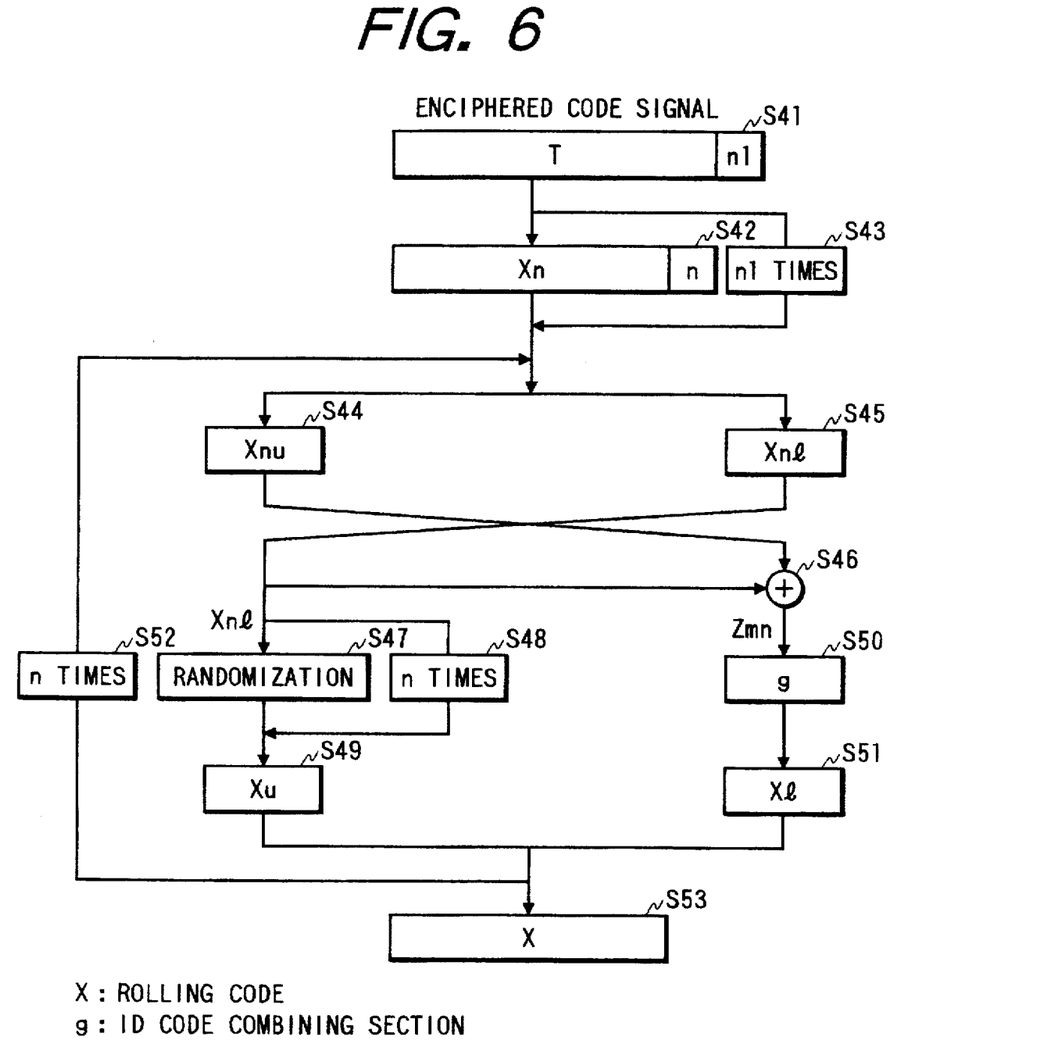
FIG. 6 is a flow chart showing details of a decoding procedure in accordance with the embodiment of the present invention.
Figure 7:
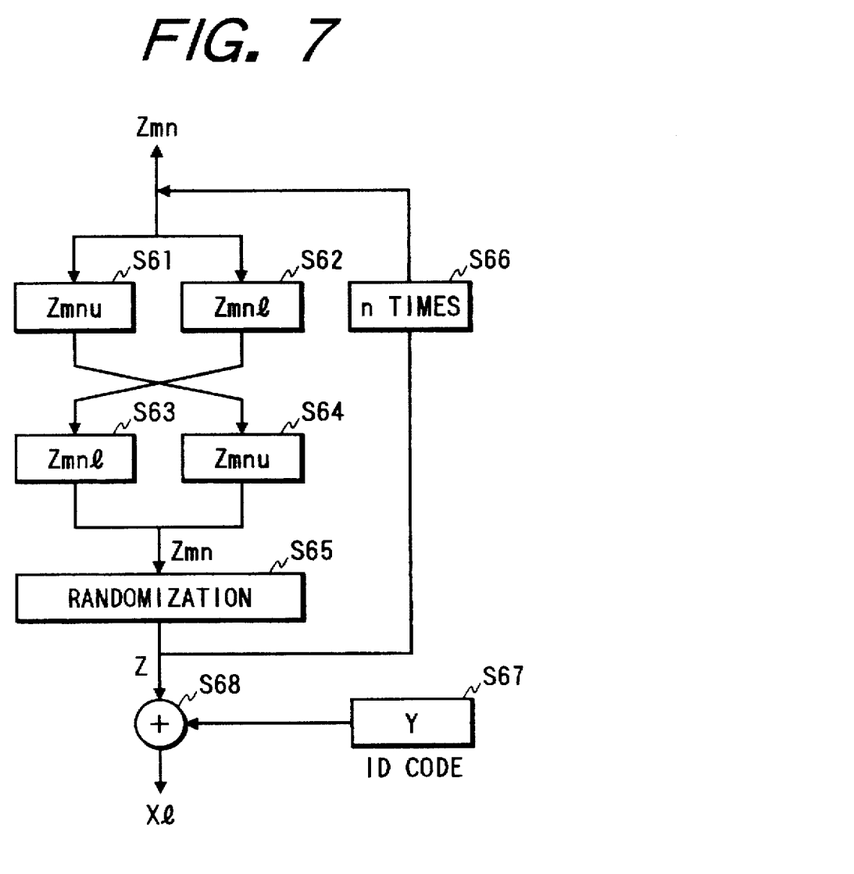
FIG. 7 is a flow chart showing part of the above decoding procedure in accordance with the embodiment of the present invention.

FIGS. 6 and 7 are flow charts showing details of the decoding procedure carried out in the micro processor 21. First, in step S41 of FIG. 6, the enciphered code signal "T", transmitted from the transmitter 1 to the receiver 2, is memorized.

In steps S42 and S43, the arithmetic repetition number "n" and "Xn" are obtained based on the enciphered code signal "T" and "n1" by calculating original numerals using maximum length shift register sequence of 68 bit primitive polynomial.

In steps S44 and S45, "Xn" is divided into an upper order block "Xnu" and a lower order block "Xnl".

In step S46, an exclusive OR operation is performed for the upper order block "Xnu" and the lower order block "Xnl", thereby obtaining "Zmn" (Zmn=Xnu ^ Xnl).

In steps S47 and S48, the upper order block "Xu" is obtained based on the lower order block "Xnl" by repeating n times the calculation for obtaining the original numerals using maximum length shift register sequence of 32-bit primitive polynomial.

In step S49, thus decoded upper order block "Xu" is memorized.

In step S50, the processing of the ID code combining section "g" is performed to obtain the lower order block "Xl" from "Zmn". Details of the processing of the ID code combining section "g" will be explained with reference to steps S61 through S68 shown in FIG. 7.

In step S51, thus decoded lower order block "Xl" is memorized.

In step S52, the procedure returns to the steps S44 and S45 to repeat the above-describe arithmetic operation n times.

In step S53, the rolling code "X" is finally obtained by joining the decoded upper order block "Xu" and the decoded lower order block "Xl", thereby completing the decoding operation of the rolling code. The receiver 2, memorizing the previous rolling code, judges whether the presently received and decoded rolling code is a correct one or not.

FIG. 7 shows the details of the processing of the ID code combining section "g".

In steps S61 and S62, "Zmn" is divided into an upper order block "Zmnu" and a lower order block "Zmnl".

In steps S63 and S64, the upper order block "Zmnu" and the lower order block "Zmnl" are mutually replaced, thereby obtaining "Zmn".

In step S65, the original numeral "Z" is calculated by randomizing thus obtained "Zmn" using maximum length shift register sequence of 32-bit primitive polynomial.

In step S66, the procedure returns to the steps S61 and S62 to repeat the above-described replacement and decoding operation n times, thereby finally obtaining the value "Z".

In step S67, the ID code "Y" is memorized.

In step S68, the lower order block "Xl" is obtained by performing an exclusive OR operation for the value "Z" and the ID code "Y".

The arithmetic operation for calculating the original value "Z" using the maximum length shift register sequence of primitive polynomial is as follows:

a) all bits except for the highest order bit, which are one bit higher order than the bits expressed by the primitive polynomial, are applied an exclusive OR operation; and b) the original numerals are shifted right by one bit, and the result of a) is entered into the highest order bit.

For example, for a 32-bit pseudo-randomization, an exclusive OR operation is performed for the 32nd bit, 7th bit, 5th bit, 3rd bit, 2nd bit and 1st bit. Then, the exclusive OR result thus obtained is entered into the 32nd bit, while the numerals in the original 32 bits are shifted right by one bit.

Furthermore, when the linear congruence method is used, the pseudo-randomization is realized by the combination of multiplication and addition since it uses a recurrence formula $I_{j+1} = a \cdot I_j + c \pmod{m}$. In a reverse randomization in the decoding operation, the constant "c" is subtracted and the "1/a" is multiplied.

Although the above-described embodiment is based on the ID code signal carried by radio waves, it is needless to say that the ID code transmission of the present invention can be realized, for example, by infrared ray or cable. In addition, the application of this system is not limited to vehicles only; in other words, it is possible to employ this system in various keyless entry systems.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An enciphering system comprising:

memory means for memorizing an ID code;

first arithmetic means for enciphering said ID code outputted from said memory means;

transmitting means for transmitting an enciphered ID code produced by said first arithmetic means;

receiving means for receiving said enciphered ID code transmitted from said transmitting means;

second arithmetic means for decoding said enciphered ID code, wherein said first arithmetic means divides both said ID code and an associated rolling code into a plurality of blocks, said rolling code varying its content in response to each transmission of said ID code through said transmitting means, determines a repetition number for an enciphering arithmetic operation in a process of said arithmetic operation, and repeats said enciphering arithmetic operation in each block according to said repetition number, thereby enciphering said ID code, and said second arithmetic means decodes said enciphered ID code by reversely performing the operation of said first arithmetic means.

2. The enciphering system defined by claim 1, wherein said first arithmetic means enciphers said ID code and said rolling code in each block by repeating a bit arithmetic operation of replacement, shift and exclusive OR and a randomization using pseudo-random numbers.

3. The enciphering system defined by claim 2, wherein said randomization is performed using maximum length shift register sequence of primitive polynomial or a recurrence formula of a linear congruence method.

4. The enciphering system defined by claim 1, wherein said memory means, said first arithmetic means and said transmitting means are assembled into a handy unit, while said receiving means and said second arithmetic means are provided in an object to be protected by a burglar alarm system.

5. The enciphering system defined by claim 4, wherein said object to be protected by the burglar alarm system is an automotive vehicle and said handy unit is a key for the automotive vehicle.

6. A transmitter used in an enciphering system for sending an ID code to an object employing a keyless entry system, said transmitter comprising:

memory means for memorizing said ID code;

arithmetic means for enciphering said ID code outputted from said memory means; and transmitting means for transmitting an enciphered ID code produced by said arithmetic means;

wherein said arithmetic means divides both said ID code and an associated rolling code into a plurality of blocks, said rolling code varying its content in response to each transmission of said ID code through said transmitting means, determines a repetition number for an enciphering arithmetic operation in a process of said arithmetic operation, and repeats said enciphering arithmetic operation in each block according to said repetition number, thereby enciphering said ID code.

7. A receiver used in an enciphering system for receiving an enciphered ID code at an object employing a keyless entry system, said receiver comprising:

receiving means for receiving said enciphered ID code; and arithmetic means for decoding said enciphered ID code, wherein said arithmetic means decodes said enciphering ID code by reversely performing an enciphering arithmetic operation of an associated transmitter, when said transmitter divides both an ID code and an associated rolling code into a plurality of blocks, said rolling code varying its content in response to each transmission of said ID code, determines a repetition number for an enciphering arithmetic operation, and repeats said enciphering arithmetic operation in each block according to said repetition number.

8. An enciphering method comprising steps of:

memorizing an ID code in a transmitter;

dividing both said ID code and an associated rolling code into a plurality of blocks, said rolling code varying its content in response to each transmission of said ID code through said transmitter;

determining a repetition number for an enciphering arithmetic operation in a process of said arithmetic operation;

repeating said enciphering arithmetic operation in each block according to said repetition number, thereby enciphering said ID code, and transmitting said enciphered ID code from said transmitter to a receiver;

receiving said enciphered ID code in said receiver;

decoding said enciphered ID code in said receiver by reversely performing the operation of said enciphering arithmetic operation.

9. The enciphering method defined by claim 8, wherein said ID code and said rolling code are enciphered in each block by repeating a bit arithmetic operation of replacement, shift and exclusive OR and a randomization using pseudo-random numbers.

10. The enciphering method defined by claim 9, wherein said randomization is performed using maximum length shift register sequence of primitive polynomial or a recurrence formula of a linear congruence method.

11. The enciphering method defined by claim 8, wherein said transmitter is assembled into a handy unit, while said receiver is provided in an object to be protected by a burglar alarm system.

12. The enciphering method defined by claim 11, wherein said object to be protected by the burglar alarm system is an automotive vehicle and said handy unit is a key for the automotive vehicle.

13. The enciphering system defined by claim 1, wherein said repetition number is determined using a predetermined equation using parameters obtained in said enciphering arithmetic operation.

14. The enciphering system defined by claim 13, wherein said predetermined equation obtains a remainder in a given division using the parameters obtained in said enciphering arithmetic operation.

15. The transmitter defined by claim 6, wherein said repetition number is determined using a predetermined equation using parameters obtained in said enciphering arithmetic operation.

16. The transmitter defined by claim 15, wherein said predetermined equation obtains a remainder in a given division using the parameters obtained in said enciphering arithmetic operation.

17. The receiver defined by claim 7, wherein said repetition number is determined using a predetermined equation using parameters obtained in said enciphering arithmetic operation.

18. The receiver defined by claim 17, wherein said predetermined equation obtains a remainder in a given division using the parameters obtained in said enciphering arithmetic operation.

19. The enciphering method defined by claim 8, wherein said repetition number is determined using a predetermined equation using parameters obtained in said enciphering arithmetic operation.

20. The enciphering method defined by claim 19, wherein said predetermined equation obtains a remainder in a given division using the parameters obtained in said enciphering arithmetic operation.

* * * * *